United States Patent
Hwang (10) Patent No.: US 10,840,484 B2
(45) Date of Patent: Nov. 17, 2020

(54) HEAT-RADIATION MODULE AND ELECTRIC VEHICLE BATTERY PACK USING SAME

(71) Applicant: AMOGREENTECH CO., LTD., Gimpo-si (KR)

(72) Inventor: Seung Jae Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 120 days.

(21) Appl. No.: 16/084,762

(22) PCT Filed: Mar. 29, 2017

(86) PCT No.: PCT/KR2017/003389
§ 371 (c)(1),
(2) Date: Sep. 13, 2018

(87) PCT Pub. No.: WO2017/171383
PCT Pub. Date: Oct. 5, 2017

(65) Prior Publication Data
US 2019/0081293 A1    Mar. 14, 2019

(30) Foreign Application Priority Data
Mar. 29, 2016 (KR) ........................ 10-2016-0037554

(51) Int. Cl.
*H01M 2/10* (2006.01)
*H01M 10/6551* (2014.01)
(Continued)

(52) U.S. Cl.
CPC ....... *H01M 2/1077* (2013.01); *H01M 2/1094* (2013.01); *H01M 10/613* (2015.04);
(Continued)

(58) Field of Classification Search
CPC ............ H01M 2/10; H01M 2/12; H01M 2/02; H01M 10/6551; H01M 10/6572
See application file for complete search history.

(56) References Cited

U.S. PATENT DOCUMENTS

2010/0209760 A1* 8/2010 Yoshihara ........... H01M 10/625
                                                   429/162
2011/0059345 A1* 3/2011 Kim .................... H01M 2/0212
                                                   429/120
(Continued)

FOREIGN PATENT DOCUMENTS

KR    20050018518     2/2005
KR    20090107443     10/2009
(Continued)

OTHER PUBLICATIONS

International Search Report—PCT/KR2017/003389 dated Jun. 30, 2017.

*Primary Examiner* — Kenneth J Douyette
(74) *Attorney, Agent, or Firm* — Cantor Colburn LLP (57) ABSTRACT

Provided are a heat-radiation module and a battery pack for an electric vehicle using the same. The heat-radiation module includes a vapor chamber contacting a heat generation device to uniformly collect heat generated from the heat generation device; a heat sink for diffusing and discharging the heat collected by the vapor chamber; and a heat exchanger for cooling the heat discharged from the heat sink.

11 Claims, 6 Drawing Sheets

(51) Int. Cl.
*H01M 10/613* (2014.01)
*H01M 10/6572* (2014.01)
*H01M 10/647* (2014.01)
*H01M 10/655* (2014.01)
*H01M 10/653* (2014.01)
*H01M 10/66* (2014.01)
*H01M 10/625* (2014.01)
*H01M 10/6554* (2014.01)

(52) U.S. Cl.
CPC ....... *H01M 10/625* (2015.04); *H01M 10/647* (2015.04); *H01M 10/653* (2015.04); *H01M 10/655* (2015.04); *H01M 10/6551* (2015.04); *H01M 10/6554* (2015.04); *H01M 10/6572* (2015.04); *H01M 10/66* (2015.04); *H01M 2220/20* (2013.01)

(56) References Cited

U.S. PATENT DOCUMENTS

| | | | | |
|---|---|---|---|---|
| 2012/0177952 | A1* | 7/2012 | Maguire | H01M 10/6567 429/1 |
| 2014/0370339 | A1* | 12/2014 | Kim | H01M 10/6567 429/72 |

FOREIGN PATENT DOCUMENTS

| | | |
|---|---|---|
| KR | 20120004322 | 1/2012 |
| KR | 101177887 | 8/2012 |
| KR | 20140020376 | 2/2014 |
| KR | 20150146259 | 12/2015 |

\* cited by examiner

HEAT-RADIATION MODULE AND ELECTRIC VEHICLE BATTERY PACK USING SAME

TECHNICAL FIELD

The present invention relates to a heat-radiation module, and more particularly, to a heat-radiation module capable of improving the heat-radiation performance and maintaining an ambient temperature of a heat generation device within a predetermined range, and a battery pack for an electric vehicle using the same.

BACKGROUND ART

Recently, with the rapid development of industrial technologies, various industrial devices such as automobile, electronics, aerospace, home and other industries that are performing with higher performance and more various functions are being released.

These industrial devices require high performance, versatility, and light weight shortening compared with the previous ones. Recently released industrial devices require various heat-radiation parts and heat-radiation modules to solve the heat generation problems accompanying operation.

Generally, a component such as a heat sink is used for heat-radiation. However, the heat sink is excellent in heat-radiation performance, but is considerably insufficient to independently radiate heat generated by a heat generation device combined with high performance and highly integrated components.

Therefore, it is necessary to develop a heat-radiation module that is more advanced and has higher heat-radiation performance.

Korean Patent Application Publication No. 2009-0107443 discloses a heat-radiation plate interposed between battery cells. The heat-radiation plate includes a composite sheet in which a thermally conductive filler is filled in a matrix resin, and carbon fibers inserted into an inside of the composite sheet, wherein the carbon fibers are inserted so as to extend from the inside of the composite sheet to an edge of the heat-radiation plate.

When the heat-radiation plate of the prior art is interposed between the battery cells to stack the batteries, the thickness of the stacked module becomes thicker as the thickness of the heat-radiation plate is increased, so that a larger number of batteries cannot be stacked on the same area. Accordingly, the prior art heat-radiation plate has a disadvantage that the capacity is reduced, and does not provide a specific heat-radiation module for efficiently cooling the entire battery cells including the heat-radiation plate.

DISCLOSURE

Technical Problem

The present invention has been made in view of the above-described problem, and an object of the present invention is to provide a heat-radiation module capable of uniformly collecting, diffusing and radiating heat generated in a heat generation device to improve heat-radiation performance, and a battery pack for an electric vehicle using the same.

Another object of the present invention is to provide a heat-radiation module capable of continuously maximizing the efficiency of a pouch-type battery built in a battery pack for an electric vehicle, and the battery pack for an electric vehicle using the same.

It is still another object of the present invention to provide a battery pack for an electric vehicle capable of realizing a high capacity by stacking and assembling a larger number of batteries in the same area.

Technical Solution

According to an aspect of the present invention, there is provided a heat-radiation module including: a vapor chamber contacting a heat generation device to uniformly collect heat generated in the heat generation device; a heat sink for diffusing and discharging the heat collected by the vapor chamber; and a heat exchanger for cooling the heat discharged from the heat sink.

Here, the heat-radiation module may further include a Peltier element interposed between the vapor chamber and the heat sink.

The heat sink may be emission-coated with a ceramic material having heat radiation and insulating properties or a material having heat radiation and non-insulation properties.

The ceramic material having thermal radiation and insulating properties may include at least one of boron nitride (BN), alumina, magnesia, silicon oxide, silicon carbide, titanium carbide, silicon nitride and aluminum nitride.

The material having thermal radiation and non-insulation properties may include at least one of graphite, carbon, and carbon nano tube (CNT).

According to an aspect of the present invention, there is provided a battery pack for an electric vehicle including: a heat-radiation plastic pack having a plurality of stacked heat-radiation cartridges each being packed with a pair of batteries; and a heat-radiation module comprising a vapor chamber contacting the heat-radiation plastic pack to uniformly collect heat generated from the heat-radiation plastic pack, a heat sink for diffusing and discharging the collected heat of the vapor chamber, and a heat exchanger for cooling the heat discharged from the heat sink.

The heat-radiation cartridge includes a frame structure including a receiving penetration hole located in a central region for accommodating a pair of batteries and a seating portion formed on an inner circumferential wall of the receiving penetration hole to seat the pair of batteries, wherein the frame structure may be molded with a heat-radiation plastic and may include an aluminum frame which may be insert-injection-molded.

The frame structure includes: a heat-radiation plastic frame having a seating portion surrounding the receiving penetration hole in which the pair of batteries are accommodated and arranged at both ends thereof in the longitudinal direction; and an aluminum frame integrated on an outside of the seating portion along the longitudinal direction of the heat-radiation plastic frame.

The battery pack further includes an oxide film layer formed of alumina ($Al_2O_3$) formed by anodizing the surface of the aluminum frame.

The battery pack further may further include an insulating plastic plate insert-injected into the heat-radiation plastic frame, wherein the pair of batteries may be pouch-type batteries, and electrode terminals of the pouch-type batteries may be assembled on an insulating plastic plate.

Also, the heat-radiation cartridge may be a frame structure molded with a heat-radiation plastic and capable of accommodating a pair of batteries, wherein the frame structure may include a receiving penetration hole provided in a central region thereof; and a seating portion formed on a side wall of the receiving penetration hole to seat the pair of batteries.

Here, the seating portion may be a protrusion protruding from the side wall of the receiving penetration hole such that the side wall of the receiving penetration hole is horizontally divided into two portions.

The heat-radiation plastic may be a moldable resin in which an insulating heat-radiation filler is dispersed.

The seating portion may be positioned between the pair of batteries.

The depth of the receiving penetration hole may be substantially equal to or greater than the thickness of the pair of batteries.

The frame structure may further include an insert-molded metal plate, and the metal plate may be insert-molded into a frame structure region adjacent to the seating portion.

In addition, the battery pack may further include a thermal interface material (TIM) insert-injected into the seating portion of the frame structure, or a TIM may be coupled to a coupling groove formed in the seating portion.

Advantageous Effects

According to the present invention, the heat generated in the heat generation device including the battery pack for an electric vehicle can be uniformly collected in the vapor chamber, diffused and discharged in the heat sink, and cooled in the heat exchanger, thereby maximizing heat-radiation efficiency.

According to the present invention, the Peltier element is interposed between the vapor chamber of the heat-radiation module and the heat sink in the heat-radiation module, and the temperature of the outer circumference of the battery pack for an electric vehicle is maintained in the range of 5° C. to 50° C. with the Peltier element. Therefore, the efficiency of pouch-type batteries built into an electric vehicle battery pack can be continuously maximized regardless of the ambient temperature.

According to the present invention, when injection-molding a heat-radiation plastic frame of a heat-radiation cartridge constituting a battery pack for an electric vehicle, an inexpensive aluminum frame may be inserted. Accordingly, the manufacturing cost can be drastically reduced, heat-radiation characteristics can be improved, excellent rigidity can be obtained, deformation can be prevented, and uniform heat-radiation characteristics can be obtained.

According to the present invention, since the heat-radiation cartridge constituting the battery pack for an electric vehicle has substantially the same thickness as a pair of batteries, it is possible to embed a larger number of batteries in the same area in the battery pack in which a plurality of heat-radiation cartridges are stacked. Therefore, there is an advantage that the battery pack can be made slimmer, thinner, and higher in capacity.

BEST MODE

Hereinafter, embodiments of the present disclosure will be described in detail with reference to the accompanying drawings.

The heat-radiation module 1000 according to an embodiment of the present disclosure can be used as a module for radiating heat from all devices generating heat including a battery pack for an electric vehicle.

Figure 1:
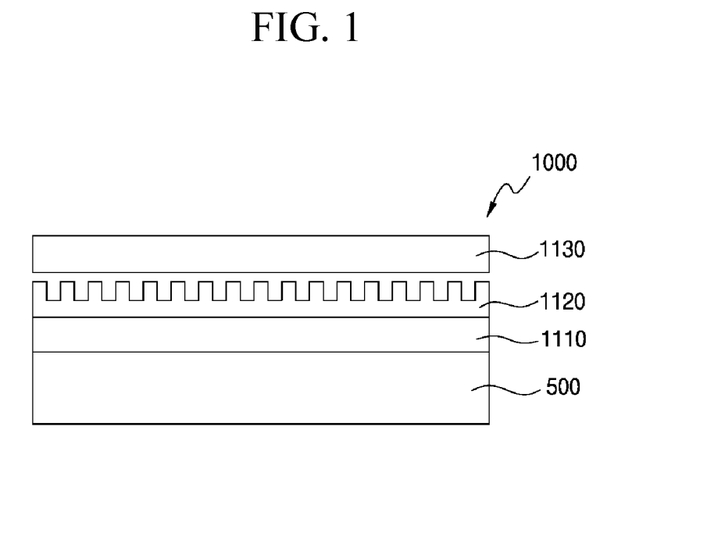
FIG. 1 is a schematic side view of a heat-radiation module according to a first embodiment of the present invention.

Referring to FIG. 1, the heat-radiation module 1000 includes a vapor chamber 1110 contacting a heat generation device 500 to uniformly collect heat generated in the heat generation device 500; a heat sink 1120 for diffusing and discharging the heat collected by the vapor chamber 1110; and a heat exchanger 1130 for cooling the heat discharged from the heat sink 1120.

The vapor chamber 1110 is a chamber made of a material having excellent thermal conductivity, such as an aluminum material, and a liquid refrigerant such as Freon is contained in the chamber.

When the heat generated by the heat generation device 500 is transferred to the vapor chamber 1110, the liquid refrigerant is vaporized and thus heat exchange is performed, so that the heat generated from the heat generation device 500 can be rapidly collected.

In this case, a large number of capillaries are formed in the vapor chamber 1110, and the vaporized refrigerant enters the plurality of capillaries.

The heat sink 1120 diffuses and radiates the heat transferred by heat exchange with the outside air, and fins are formed on an outer air contact surface of the heat sink 1120 to increase a contact area with the outside air to promote heat-radiation.

Further, the heat sink 1120 can further be emission-coated with a material having excellent heat-radiation property.

The emission-coating is intended to further maximize the radiation of heat transferred from the heat sink 1120. The emission-coating is to coat the heat sink 1120 with a ceramic material having thermal radiation and insulation properties or a material having thermal radiation and non-insulation properties.

The ceramic material having thermal radiation and insulating properties may include at least one of boron nitride (BN), alumina, magnesia, silicon oxide, silicon carbide, titanium carbide, silicon nitride and aluminum nitride.

In addition, the material having thermal radiation and non-insulation properties may include at least one of graphite, carbon, and carbon nano tube (CNT).

The heat exchanger 1130 is provided to cool the heat released from the heat sink by lowering the temperature of the outside air contacting the heat sink 1120. The heat exchanger 1130 may employ any possible heat exchanger capable of lowering the temperature of the heat sink 1120, including an air-cooled type heat exchanger such as a cooling fan, and a water-cooled heat exchanger using cooling water.

Therefore, in some embodiments of the present invention, since the heat generated in the heat generation device is uniformly collected in the vapor chamber 110, diffused and discharged in the heat sink 1120, and cooled in the heat exchanger 1130, to thereby provide advantages capable of maximizing heat-radiation efficiency.

Figure 2:
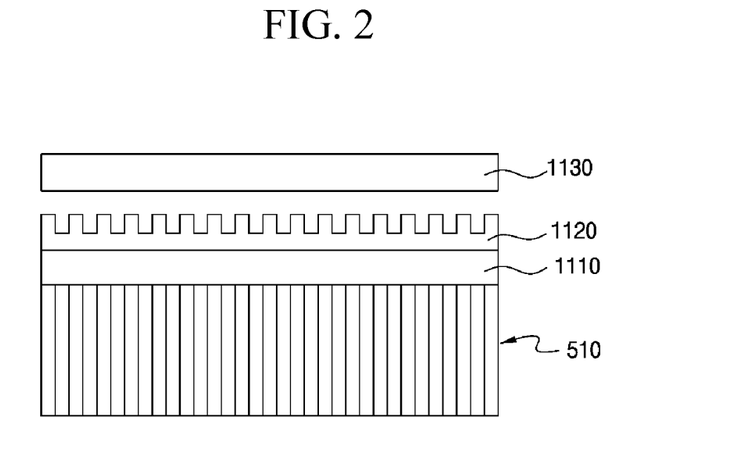
FIG. 2 is a conceptual side view of a battery pack for an electric vehicle equipped with a heat-radiation module according to the first embodiment of the present invention.

Referring to FIG. 2, the heat-radiation module according to the first embodiment of the present invention may be mounted on a battery pack for an electric vehicle applied as a heat generation device, so that heat generated from the battery pack for an electric vehicle can be efficiently radiated.

In some embodiments of the present invention, technical features are included in a structure of a heat-radiation cartridge constituting a battery pack for an electric vehicle.

In other words, the battery pack for an electric vehicle applied to an embodiment of the present invention is a battery pack 510 by stacking a plurality of stacked heat-radiation cartridges each packed with a pair of batteries. The thickness of a pair of batteries packed in the heat-radiation cartridge is substantially the same as the thickness of the heat-radiation cartridge, to thereby obtain a slim, lightweight, and high capacity battery pack for an electric vehicle.

For example, when 150 batteries are mounted in a battery pack for an electric vehicle, 149 heat-radiation fins or heat-radiation plates are required when a battery pack is implemented through heat-radiation fins such as aluminum fins or prior art heat-radiation plates between the batteries. In this case, the battery pack cannot be made lightweight, and the batteries cannot be assembled with as many as 149 heat-radiation fins or heat-radiation plates in the battery pack, and thus the battery capacity is reduced.

Hereinafter, the heat-radiation cartridges will be described in more detail with reference to FIGS. 3 to 10.

Figure 3:
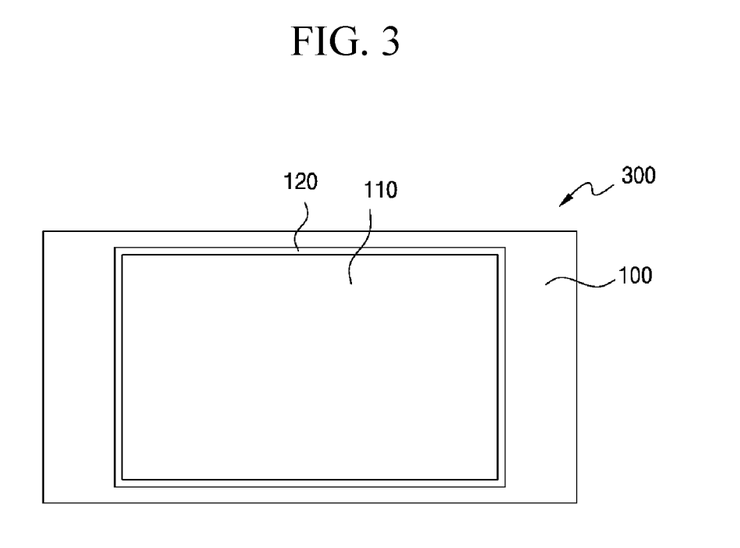
FIG. 3 is a plan view of an exemplary heat-radiation cartridge constituting a battery pack for an electric vehicle according to an embodiment of the present invention.

Referring to FIG. 3, an exemplary heat-radiation cartridge 300 of the battery pack for an electric vehicle according to an embodiment of the present invention is a frame structure 100 injection-molded with a heat-radiation plastic so as to be capable of receiving a pair of batteries. The frame structure 100 includes a receiving penetration hole 110 provided in a central region thereof; and a seating portion 120 protruding from side walls of the receiving penetration hole 110 to seat the pair of batteries.

The batteries are formed, for example, in a rectangular shape, and thus the receiving penetration hole 110 and the seating part 120 are also formed in a rectangular shape.

The seating part 120 is a protrusion protruding from the side walls of the receiving penetration hole 110 so as to horizontally divide the side walls of the receiving penetration hole 110 into two parts. Through the upper and lower portions of the frame structure 100, a pair of batteries can be inserted into the receiving penetration hole 110 and seated in place.

The seating portion 120 is preferably formed along the side walls of the receiving penetration hole 110 and may be formed separately in a plurality of areas of the side walls of the receiving penetration hole 110 as being the case.

The battery is preferably an electrochemically chargeable and dischargeable pouch-type battery which is a thin energy storage device capable of including high energy density and performing high output driving. The pouch-type battery is manufactured by sealing a pouch including two electrodes, a separator and an electrolyte filled therein.

The heat-radiation plastic employs a non-insulating moldable resin in which an electrically conductive heat-radiation filler made of a material such as graphene or carbon is dispersed and an insulating moldable resin in which an insulating heat-radiation filler such as BN, AlN, MgO, $Al_2O_3$, or $SiO_2$ is dispersed. Generally, an insulating heat-radiation plastic using an insulating heat-radiation filler is used as the heat-radiation plastic, which can be defined as being capable of being injection-molded in a mold, while radiating the heat transferred by the insulating heat-radiation filler, and maintaining insulation by the insulating heat-radiation filler and resin.

Therefore, the heat-radiation cartridge 300 containing the heat-radiation filler can radiate heat generated by the charge/discharge of the battery. Here, the heat transferred to the heat-radiation cartridge 300 is cooled by a heat exchanger. The heat exchanger may use any possible heat exchanger capable of lowering the temperature of the heat-radiation cartridge 300 such as an air-cooled heat exchanger such as a cooling fan and a water-cooled heat exchanger using cooling water.

Accordingly, in some embodiments of the present invention, there is an advantage that batteries can be installed in the heat-radiation cartridge 300 to efficiently radiate heat generated from the batteries.

Figure 4:
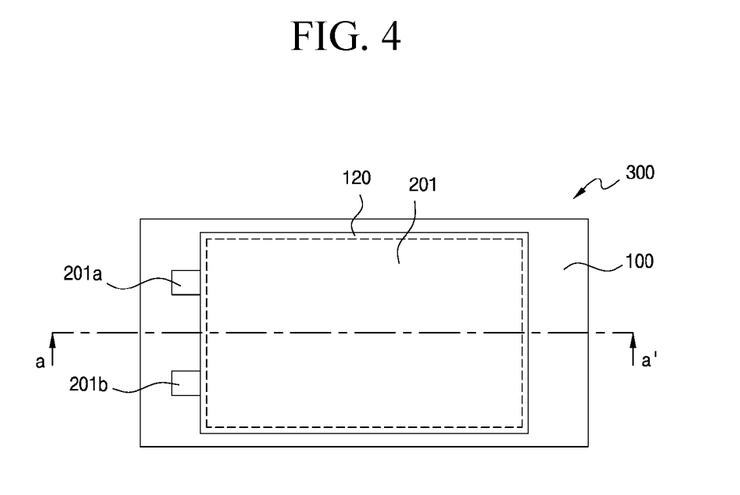
FIG. 4 is a plan view of a heat-radiation cartridge equipped with batteries according to an embodiment of the present invention.

Referring to FIG. 4, a first battery 201 is seated on a seating portion 120 at an upper portion of a frame structure 100 of a heat-radiation cartridge 300 and accommodated in a divided area of a receiving penetration hole 110, and a second battery (not shown) is seated in the seating portion 120 at a lower portion of the frame structure 100 and accommodated in the remaining divided area of the receiving penetration hole 110.

Here, electrode terminals of the first battery 201 and the second battery (not shown) are not located in the receiving penetration hole 110 but are in close contact with the frame structure 100. That is, as shown in FIG. 4, the electrode terminals 201*a* and 201*b* of the first battery 201 are in close contact with the frame structure 100 of the heat-radiation cartridge.

Meanwhile, when the first battery 201 and the second battery (not shown) are used as a pouch-shaped battery, respectively, an edge area of the pouch-shaped battery has larger heat-radiation performance than an inner area thereof.

Therefore, in order to radiate the heat generated from the edge areas of the first battery 201 and the second battery (not shown) at the time of the charging and discharging of the first battery 201 and the second battery (not shown), there is a structural feature in which the seating portion 120 of the frame structure 100 is interposed between the edge areas of the first battery 201 and the second battery (not shown).

Figure 5:
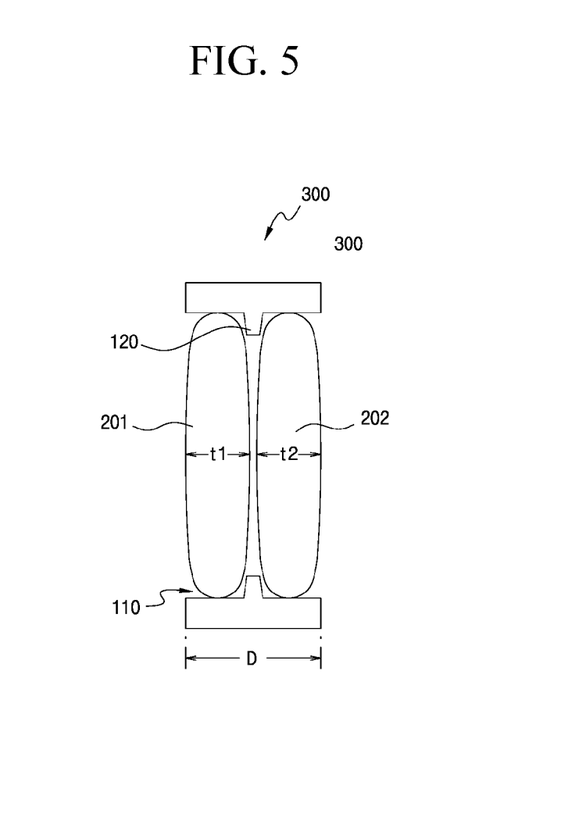
FIG. 5 is a cross-sectional view taken along line a-a' in FIG. 4.

FIG. 5 is a cross-sectional view cut along line a-a' of FIG. 4 to illustrate a state where a pair of batteries are mounted on an example heat-radiation cartridge according to an embodiment of the present invention.

That is, first and second batteries 201 and 202 are received and assembled into a receiving penetration hole 110 of a frame structure 100 of an example of a heat-radiation cartridge 300.

Therefore, the receiving penetration hole 110 of the heat-radiation cartridge 300 is divided into two areas by the seating portion 120 located between the edges of the first and second batteries 201 and 202, and the first and second batteries 201 and 202 are accommodated in the divided two areas, respectively, so that smooth assembly alignment can be obtained.

Here, the heat-radiation cartridge 300 is designed to house two batteries, that is, the first and second batteries 201 and 202, in the receiving penetration hole 110. Here, the depth D of the receiving penetration hole 110 of the heat-radiation cartridge 300 may be substantially equal to or slightly larger than the thickness t1+t2 of the two batteries 201 and 202.

Therefore, the batteries 201 and 202 do not protrude from the stacked surface of the heat-radiation cartridge 300.

Figure 6:
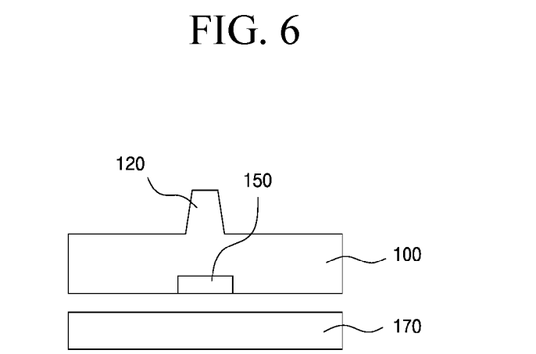
FIG. 6 is a partial cross-sectional view illustrating a state in which a metal plate is formed on an example of a heat-radiation cartridge according to an embodiment of the present invention.

Referring to FIG. 6, in an embodiment of the present invention, a metal plate 150 having a high thermal conductivity can be insert-molded with a frame structure 100 of an exemplary heat-radiation cartridge.

Here, it is preferable that the metal plate 150 is insert-molded in a region of the frame structure 100 adjacent to a seating portion 120. More specifically, the metal plate 150 is insert-molded in the region of the frame structure 100 opposed to the seating portion 120, that is, the region of the frame structure 100 opposed to the seating portion 120 which is realized by being protruded from the side walls of the receiving penetration hole of the frame structure 100, so that the metal plate 150 can rapidly discharge the heat generated from the batteries to the outside through the seating portion 120 and the metal plate 150.

The metal plate 150 is preferably made of an aluminum material having an excellent thermal conductivity and a low price, and one side of the insert-molded metal plate 150 may be exposed to the outside.

As described above, the seating portion 120 of the frame structure 100 of the example heat-radiation cartridge 100 is disposed between the edge regions of the battery to radiate heat generated from the battery. The metal plate 150 is preferably insert-molded at a position closest from the seating portion 120.

In other words, as shown in FIG. 6, the metal plate 150 is placed on the frame structure 100 under the seating portion 120 and the heat transferred from the battery to the seating portion 120 is quickly transferred to a heat exchanger 170 through the metal plate 150.

Figure 7A:
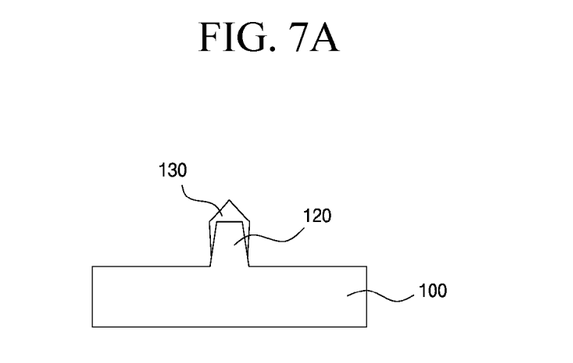
FIGS. 7A and 7B are partial cross-sectional views illustrating a state in which a TIM is coupled to a seating portion of a heat-radiation cartridge according to an embodiment of the present invention.

In addition, as shown in FIG. 7A in some embodiments of the present disclosure, a thermal interface material (TIM) 130 may be insert-injected into the seating portion 120 of the frame structure 100 of the example heat-radiation cartridge.

Figure 7B:
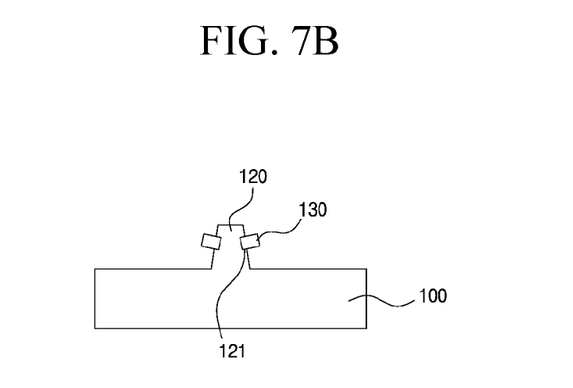

In addition, as shown in FIG. 7B, a coupling groove 121 may be formed in the seating portion 120, and the TIM 130 may be coupled to the coupling groove 121.

When the TIM 130 is insert-injected into the seating portion 120 or is coupled to the coupling groove, the contact heat resistance is reduced, and the air layer between the pair of batteries is reduced, so that heat can be smoothly discharged to an external heat exchanger.

The TIM 130 may be of various types such as a heat-radiation grease, a heat-radiation sheet, a metal plate, a thermally conductive adhesive, and the like.

Figure 8:
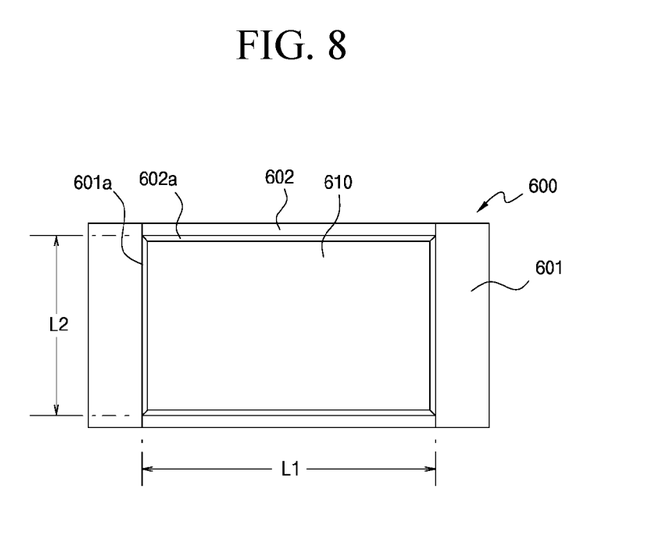
FIG. 8 is a plan view of another example of a heat-radiation cartridge constituting a battery pack for an electric vehicle according to an embodiment of the present invention.

The metal plate and the TIM applied to the heat-radiation cartridge of the above-described example can be coupled to a heat-radiation plastic frame 601 of the heat-radiation cartridge of another example shown in FIG. 8 and its seating portion 601a.

FIG. 8 is a plan view of another example of a heat-radiation cartridge constituting a battery pack for an electric vehicle according to an embodiment of the present invention.

Referring to FIG. 8, the heat-radiation cartridge 600 according to the embodiment of the present invention is formed of a frame structure including a receiving penetration hole 610 formed at a central region thereof to accommodate a pair of batteries and seating portions 601a and 602a formed in inner walls of the receiving hole 610 and for seating the pair of batteries. The frame structure is molded with a heat-radiation plastic in which aluminum frames 602 are insert-injection-molded.

In other words, the frame structure includes: heat-radiation plastic frames 601 having seating portions 601a and 602a surrounding the rectangular receiving penetration hole 610 for accommodating a pair of rectangular batteries and arranged at both ends of the heat-radiation cartridge 600 in the longitudinal direction; and a pair of aluminum frames 602 insert-molded and connected to the heat-radiation plastic frames 601 and integrated on an outside of the seating portion 602a along the longitudinal direction.

Here, the frame structure is the rectangular frame structure for accommodating the rectangular batteries, and the length L1 of the aluminum frame 602 is longer than the length L2 of the heat-radiation plastic frame 601.

That is, if the heat-radiation cartridge 600 is manufactured by injection-molding with an expensive heat-radiation plastic, the manufacturing cost may be high and the marketability may deteriorate. Therefore, in some embodiments of the present invention, the low-price aluminum frames 602 are inserted to thus injection-mold the heat-radiation plastic frames 601 and implement the heat-radiation cartridge 600. As a result, the manufacturing cost can be drastically reduced.

In addition, when the heat-radiation cartridge 600 is manufactured by injection-molding only with the heat-radiation plastic, the heat-radiation filler is not better in flow than the resin when the heat-radiation plastic is dispersed in the mold, and thus the heat-radiation filler can be concentrated in a local region. As a result, there is a disadvantage that uniform heat-radiation efficiency cannot be obtained.

Therefore, in some embodiments of the present invention, the heat-radiation plastic frames 601 are implemented by injection-molding a short frame region of the heat-radiation cartridge 600 with the heat-radiation plastic and a size to be injection-molded is reduced by inserting a relatively long frame region with the aluminum frames 602. Accordingly, the heat-radiation plastic frames 601 can have a more uniform heat-radiation characteristic.

In addition, the aluminum frames 602 are superior in heat conduction characteristics to the heat-radiation plastic frames 601, so that the heat-radiation characteristics of the heat-radiation cartridge 600 can be improved.

In addition, rather than embodying the frame structure with only the heat-radiation plastic frames 601 injection-molded with the heat-radiation plastic, embodying the frame structure by injection-molding the heat-radiation plastic frames 601 after inserting the aluminum frames 602 as in some embodiments of the present invention, can obtain excellent stiffness and can make it possible to prevent the occurrence of deformation such as warping due to external force.

Figure 9:
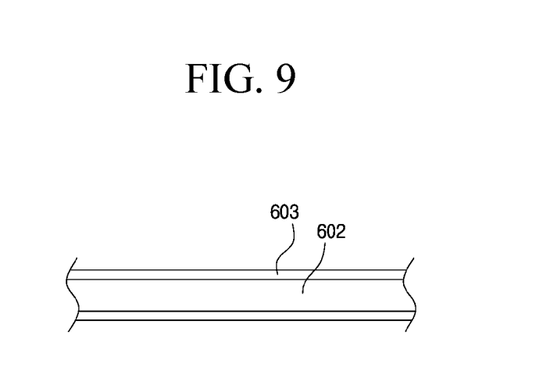
FIG. 9 is a partial cross-sectional view of a state where an oxide film layer is formed in an aluminum frame applied to the heat-radiation cartridge of FIG. 8.

FIG. 9 is a partial cross-sectional view of a state where an oxide film layer is formed in an aluminum frame applied to the heat-radiation cartridge of FIG. 8.

Referring to FIG. 9, in an embodiment of the present invention, an aluminum frame 602 is anodized to form an oxide film layer 603 of alumina ($Al_2O_3$) on a surface of the aluminum frame 602.

That is, when a voltage is applied to the aluminum frame 602 in an electrolytic solution, the aluminum frame 602 is anodized to form an oxide film layer 603 of alumina.

Here, the oxide film layer 603 of alumina can increase a radiation coefficient for radiating heat well and have an insulation characteristic.

The electrolytic solution may be an acidic electrolytic solution or an alkaline electrolytic solution, but the acidic electrolytic solution is preferably used. As the acidic electrolytic solution, sulfuric acid, oxalic acid, phosphoric acid or a mixture thereof may be used. In addition, the thickness of the oxide film layer 603 requiring insulation can be adjusted by adjusting the anodization time and the current density.

Figure 10:
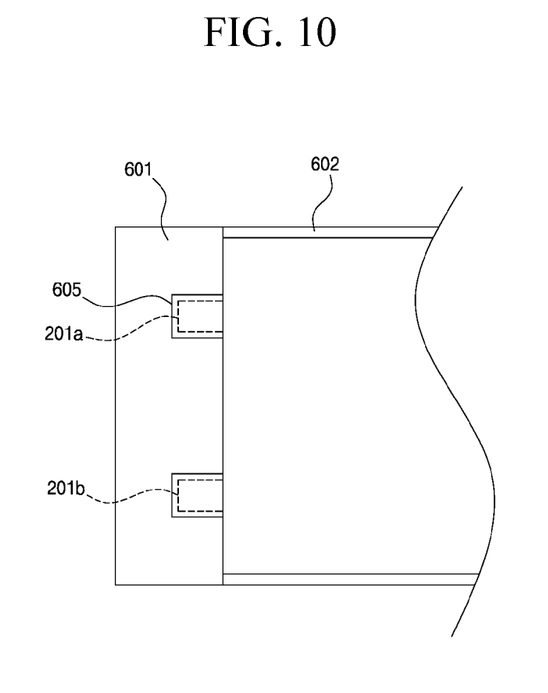
FIG. 10 is a partial plan view showing a state in which an insulating plastic is formed on a heat-radiation plastic frame made of a heat-radiation plastic of FIG. 8.

FIG. 10 is a partial plan view showing a state in which an insulating plastic is formed on a heat-radiation plastic frame made of a heat-radiation plastic of FIG. 8.

Referring to FIG. 10, electrode terminals 201*a* and 201*b* of a pouch-type battery are mounted on the heat-radiation plastic frame 601 and assembled.

Therefore, in an embodiment of the present invention, a heat-radiation plastic frame 601 can be injection-molded by inserting an insulating plastic plate 605 in an area where the electrode terminals 201*a* and 201*b* of the pouch-type battery are put on.

That is, the electrode terminals 201*a* and 201*b* of the pouch-type battery are put on and brought into contact with the insulating plastic plate 605.

Figure 11:
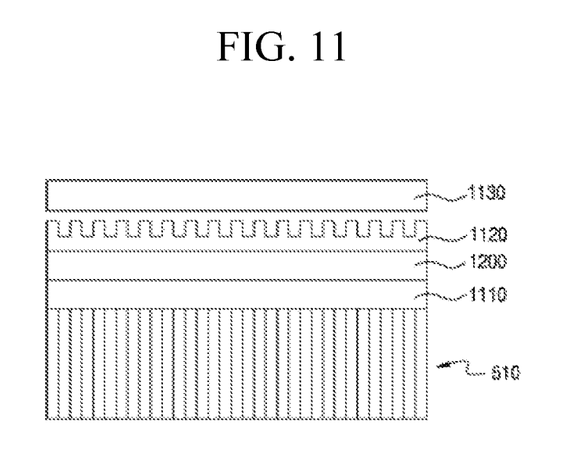
FIG. 11 is a conceptual side view of a battery pack for an electric vehicle equipped with a heat-radiation module according to a second embodiment of the present invention.

FIG. 11 is a conceptual side view of a battery pack for an electric vehicle equipped with a heat-radiation module according to a second embodiment of the present invention.

Referring to FIG. 11, a heat-radiation module according to a second embodiment of the present invention includes a Peltier element 1200 between a vapor chamber 1110 and a heat sink 1120.

The Peltier element 1200 is a device that is operated by a power source supplied from an outside and of which one side is cold and the other side is hot. In some embodiments of the present invention, the Peltier element 1200 is used to stably drive a battery pack 510 for an electric vehicle.

That is, since the pouch-type battery of the battery pack 510 for an electric vehicle has excellent charging and discharging efficiency at an ambient temperature of 5° C. to 50° C., the Peltier element 1200 is driven so that an outer peripheral temperature of the battery pack 510 for an electric vehicle is maintained at a temperature of 5° C. to 50° C., to continuously maximize the number of recharging times and battery efficiency of the battery pack 510 for an electric vehicle.

Here, the heat-radiation module is configured so that the anode terminal of the Peltier element 1200 is in contact with the vapor chamber 1110 and the heat sink 1120, and the polarity of the anode terminal of the Peltier element 1200 is changed during the winter and summer seasons, to then apply a voltage to the Peltier element 1200. The outer circumferential temperature of the battery pack 510 for an electric vehicle can be maintained in the range of 5° C. to 50° C. in all four seasons such as raising the temperature of the vapor chamber 1110 in winter and lowering the temperature of the vapor chamber 1110 in summer.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to a heat-radiation module that can improve the heat-radiation performance and maintain the ambient temperature of the heat generation device within a certain range.

What is claimed is:

1. A battery pack for an electric vehicle comprising:
   a pack having a plurality of stacked heat-radiation cartridges each being packed with a pair of batteries; and
   a heat-radiation module comprising a vapor chamber contacting the pack to collect heat generated from the pack, a heat sink for diffusing and discharging the collected heat of the vapor chamber; and a heat exchanger for cooling the heat discharged from the heat sink,
   wherein each of the stacked heat-radiation cartridges comprises: a frame structure including a receiving penetration hole located in a central region for accommodating the pair of batteries and a seating portion formed on an inner circumferential wall of the receiving penetration hole to seat the pair of batteries; and
   the frame structure comprises: a heat-radiation plastic frame arranged at both ends thereof in a longitudinal direction of the frame structure; and an aluminum frame integrated on an outside of the seating portion along a longitudinal direction of the heat-radiation plastic frame.

2. The battery pack of claim 1, further comprising an oxide film layer formed of alumina ($Al_2O_3$) formed by anodizing a surface of the aluminum frame.

3. The battery pack of claim 1, further comprising an insulating plastic plate insert-injected into the heat-radiation plastic frame, wherein the pair of batteries are pouch-type batteries, and electrode terminals of the pouch-type batteries are assembled on the insulating plastic plate.

4. The battery pack of claim 1, wherein the seating portion is a protrusion protruding from the inner circumferential wall of the receiving penetration hole such that the inner circumferential wall is horizontally divided into two portions.

5. The battery pack of claim 1, wherein the heat-radiation plastic frame is formed of a moldable resin in which an insulating heat-radiation filler is dispersed.

6. The battery pack of claim 1, wherein the seating portion is positioned between the pair of batteries.

7. The battery pack of claim 1, wherein the receiving penetration hole has a depth that is substantially equal to or greater than a thickness of the pair of batteries.

8. The battery pack of claim 1, wherein the frame structure further comprises an insert-molded metal plate.

9. The battery pack of claim 8, wherein the metal plate is insert-molded into a region adjacent to the seating portion.

10. The method of claim 1, further comprising a thermal interface material (TIM) insert-injected so as to surround the seating portion of the frame structure.

11. The battery pack of claim 1, wherein a coupling groove is formed in the seating portion and a thermal interface material (TIM) is coupled to the coupling groove.

* * * * *